United States Patent [19]
Yoshioka et al.

[11] 3,792,220
[45] Feb. 12, 1974

[54] DEVICE FOR CONNECTING EXTREME LOW TEMPERATURE CABLE WITH NORMAL TEMPERATURE ELECTRIC APPARATUS

[75] Inventors: Yoshio Yoshioka; Kenichi Okuyama, both of Hitachi, Japan

[73] Assignee: Hitachi, Ltd., Tokyo, Japan

[22] Filed: Sept. 19, 1972

[21] Appl. No.: 290,356

[52] U.S. Cl........ 200/163, 174/15 BH, 174/DIG. 6, 200/144 B
[51] Int. Cl...................... H01h 31/32, H02g 15/22
[58] Field of Search 200/163, 144 B, 166 C, 166 K; 174/19, DIG. 6, 9 R, 15 BH

[56] References Cited
UNITED STATES PATENTS
3,539,702  11/1970  Edwards et al............ 174/15 BH X
3,471,669  10/1969  Curtis.......................... 200/144 B X FOREIGN PATENTS OR APPLICATIONS
6,406,498  12/1964  Netherlands...................... 200/163
1,032,364  6/1958  Germany............................ 200/163

Primary Examiner—J. R. Scott
Assistant Examiner—Robert A. Vanderhye
Attorney, Agent, or Firm—Craig and Antonelli

[57] ABSTRACT

A disconnecting switch is provided in the connecting part between a cable kept at extremely low temperature by means of extremely low temperature coolant and an electric apparatus kept at normal room temperature such as a gas-filled duct transmission line, transformer etc., which disconnecting switch is opened when current is interrupted. And the disconnecting switch is housed in a vacuum casing.

9 Claims, 3 Drawing Figures

DEVICE FOR CONNECTING EXTREME LOW TEMPERATURE CABLE WITH NORMAL TEMPERATURE ELECTRIC APPARATUS

BACKGROUND OF THE INVENTION

1. Field of the Invention

The present invention relates to a device for connecting an extremely low temperature cable having conductor kept at extremely low temperatures with an electric apparatus kept at normal room temperature such as a gas-insulated cable a transformer and a circuit breaker, employing as insulating medium sulphur hexafluoride gas (hereafter referred to as $SF_6$ gas) or oil. Here, the term "extremely low temperatures" refers to those temperatures at which air composed mainly of nitrogen, oxygen and hydrogen can be liquefied.

2. Description of the Prior Art

The extreme low temperature cable is either a cable in which conductors are refrigerated by such a liquid coolant having a very low boiling point as liquid helium, nitrogen or hydrogen so that the specific resistances of the conductors may be by far lower than at normal temperature so as to reduce heat loss, or a cable in which such a superconductor as niobium, niobium-titanium or niobium-tin cooled down to extremely low temperatures is used so that the conductor kept in the superconductive state and therefore having zero resistance may provide no heat loss. It is now proposed that such an extreme low temperature cable should be used as either transmission lines for supplying huge electric energy for a big city or under-ground cables for drawing electric energy from a power station installed on the beach to inland distribution systems.

If the conductor of the extreme low temperature cable is coupled directly to an electric apparatus kept at room temperature, then the insulating medium used in the apparatus, which is in gaseous state at room temperature, will be liquified or solidified, so that the insulating property of the medium will be destroyed. For example, if an extreme low temperature cable with liquid nitrogen as refrigerant is coupled directly to an electric apparatus with $SF_6$ gas as insulator, the $SF_6$ gas is liquefied or solidified so that the insulating property of the gas collapses. The reason is that since the conductor of the cable is kept at a temperature of about $-196°C$ the connecting part of the electric apparatus and the $SF_6$ gas near there is cooled down to temperatures by far lower than $-64°C$ that is the boiling temperature of the $SF_6$ gas. It is therefore necessary for insulating medium or arc extinguishing medium to be prevented from being supercooled by providing moderate thermal gradient or several steps of different temperatures between the temperature at which the extreme low temperature cable is maintained and the temperatures at which the normal temperature electric apparatus may be kept, that is, which are equal to or higher than the room temperature. Thus, the conventional way of connecting an extreme low temperature cable with a normal temperature electric apparatus, employed the provision of a plurality of intermediate coolant layers inserted between the coolant of the cable and the electric apparatus, whose temperatures increase gradually toward the apparatus. Even with such a means, however, which can only fulfill its function due to Joule heat generated at the connected part when the cable is energized, the normal temperature apparatus will be extremely cooled by the cable coolant if current is interrupted, so that the supercooling of the apparatus results in the liquefication or solidification of the insulating $SF_6$ gas or oil and therefore the deterioration in dielectric strength of the insulator. Moreover, in case of initial cooling of an extreme low temperature cable by filling the cable duct with a suitable coolant, quite a long time is spent before the cable has reached the thermal equilibrium if the cable is long enough to be adapted for practical use. And during the pre-equilibrium transient, a considerable amount of heat is transferred from the normal temperature electric apparatus to the extreme low temperature cable, and therefore the efficiency of initial refrigeration is much degraded.

SUMMARY OF THE INVENTION

One object of the present invention is to provide a device for connecting an extreme low temperature cable with a normal temperature electric apparatus, with which device the insulating medium of the normal temperature electric apparatus can be prevented from being liquefied or solidified by the coolant of the cable.

Another object of the present invention is to provide a device for connecting an extreme low temperature cable with a normal temperature electric apparatus, with which device it is possible to minimize the transfer of heat from the apparatus to the conductor of the cable.

An additional object of the present invention is to provide a simple-structured device for connecting an extreme low temperature cable with a normal temperature electric apparatus.

A yet another object of the present invention is to provide a device for connecting an extreme low temperature cable with a normal temperature electric apparatus, with which the state of connection is not deteriorated due to the thermal contraction of the cable conductor.

The present invention is, therefore, characterized in that in the connection part between the cable conductor kept at extremely low temperature and an electric apparatus kept at normal temperature is provided a disconnecting switch which is open while current is interrupted and that the disconnecting switch is placed in or surrounder by vacuum or pressurized gas identical in substance with the liquid coolant for the extreme low temperature cable, whereby not only the insulator for the normal temperature electric apparatus can be prevented from being liquefied or solidified through supercooling due to the heat transfer to the cable conductor when current is interrupted, but also the liquid coolant for the cable can be prevented from being much vaporized due to the heat transfer from the apparatus to the cable.

Further objects and features of the present invention will be more apparent when the following lines of this specification which treat a few embodiments of the invention are read with the aid of the attached drawings.

DESCRIPTION OF THE PREFERRED EMBODIMENTS

Figure 1:
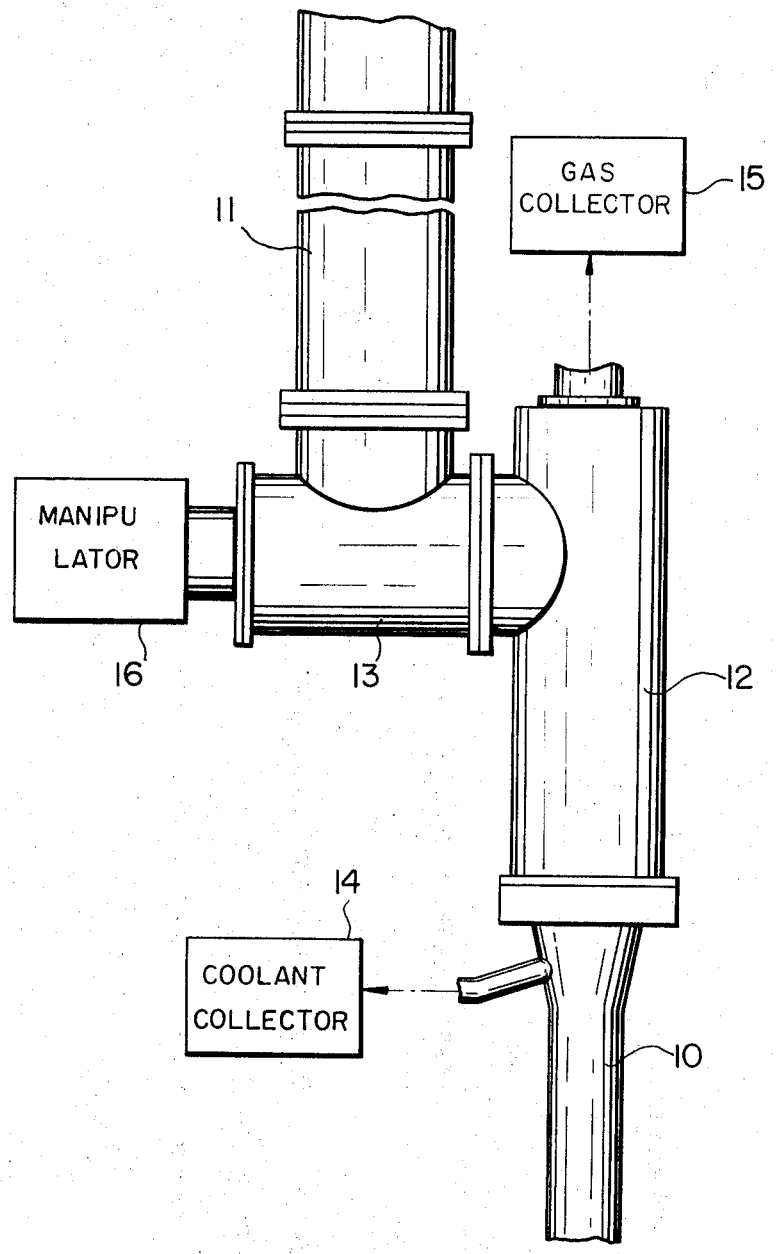
FIG. 1 is a top plan view of a device embodying the present invention, which connects an extreme low temperature cable with a gas-filled duct transmission line.

FIG. 1 shows the connection part between an extreme low temperature cable 10 and a gas-filled duct transmission line 11, in which the cable 10 and the line 11 are connected with each other via the end portion 12 of the cable 10 and a disconnecting switch 13 and in which the liquid coolant for the cable 10 is recovered by means of a coolant collector 14 while gas generated as a result of vaporization of the liquid coolant is retaken by means of a gas collector 15.

The disconnecting switch 13 in the connection part is either opened or closed by a manipulator 16.

Figure 2:
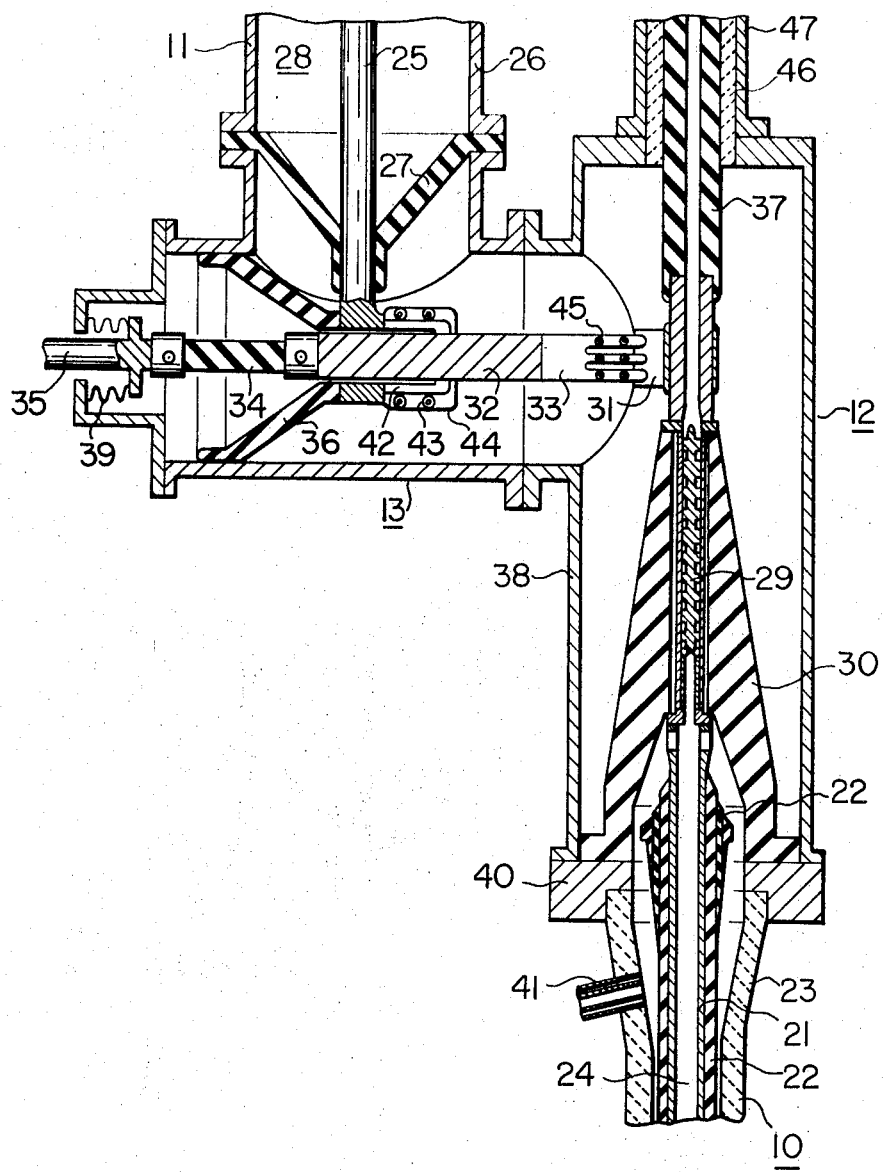
FIG. 2 is a cross sectional view of the device shown in FIG. 1.

Referring to FIG. 2 which shows the cross section of the connection part shown in FIG. 1, the cable 10 comprises a hollow cable conductor 21, an electrical insulator 22 covering the conductor 21 and a thermal insulator 23 spaced from the electrical insulator 22. The thermal insulator 23 is a multi-lamination of thermal insulating material and thin aluminum sheet as heat reflector and the multi-lamination constitutes a vacuum-tight duct to realize super-insulation. A liquid coolant 24 such as liquid nitrogen, liquid hydrogen or liquid helium is introduced into the hollow of the cable conductor 21 so as to keep the temperature of the conductor 21 extremely low. The cable conductor 21 is preferably made of Cu or Al whose electric resistance is considerably lowered at extremely low temperature or made of a superconductor such as Nb, Nb—Ti or $Nb_3Sn$ the electric resistance of which is reduced to near zero when it is cooled down below a critical temperature.

The gas-filled duct transmission line 11 comprises a conductor 25, a casing 26 and a spacer 27 and $SF_6$ gas as insulating medium fills the space 28 defined by the casing 26 and the conductor 25. The connection part constituted of the end portion 12 of the cable 10 and the circuit breaker 13 comprises a connecting conductor 29 having a hollow into which the liquid coolant 24 for the cable 10 is also introduced to provide a temperature gradient from normal to extremely low temperatures, an insulating support 30 for thermally and electrically insulating and supporting the connecting conductor 29, and a contactor 32 detachably engaged with a connector member 31 of the connecting conductor 29 and slidably engaged with the conductor 25 of the gas-filled duct transmission line 11. One end of the contactor 32 is tipped with a finger member 33 and the other end of the contactor 32 is connected via a manipulating rod 34 of electrically insulating material with an external manipulating rod 35. Moreover, the contactor 32 is not only insulated but also supported by a spacer 36.

In the sliding part in which the conductor 25 of the gas-filled duct line 11 and the contactor 32 are contacted slidably with each other, a collector 42 fixed to the conductor 25 is in slidable contact with the contactor 32. A spring 43 urges the collector 42 against the contactor 32 and a shielding member 44 covers the spring 43. The finger member 33 is also provided with a spring 45 to produce a pressing force.

Now, the gas generated from the liquid coolant 24, which established temperature gradient by cooling the connecting conductor 29, is gathered into the external gas collector 15 through a gas outlet port 37 made of insulating material. The gas outlet port 37 is surrounded by a thermal insulator 46 and the thermal insulator 46 is in turn covered by a sheath 47.

The gas collected in the gas collector 15 is cooled again to be used as liquid coolant for the cable 10. The end portion 12 of the cable 10 and a part of the disconnecting switch 13 are housed in a casing 38, which is evacuated to create vacuum therein. And in order to maintain the vacuum condition, bellows 39 are provided between the casing 38 and the external manipulating rod 35 and the spacer 27 for the gas-filled duct line 11 also hermetically seals the casing 26. A flange member 40 is provided between the extreme low temperature cable 10 and the casing 38 of the end portion to hermetically seal the casing 38.

The liquid coolant 24, after having cooled the cable conductor 10 is poured out of a coolant outlet port 41 into the coolant collector 14 and recooled to be used for cooling the cable again.

FIG. 2 shows the state of the device in which current is drawn through the connecting part, that is, current is flowing from the conductor 21 of the cable 10, through the connecting conductor 29, the connector member 31, the finger member 33, the contactor 32 and the collector 42, to the conductor 25 of the line 11. In this state, a small part of liquid coolant 24 flows into the connecting conductor 29 and heat exchange takes place at the indentations formed on the connecting conductor 29 so that the liquid coolant 24 is vaporized and warmed gradually to establish in the connecting conductor 29 a temperature gradient from extremely low to normal temperatures. By virtue of this temperature gradient, the liquefication or solidification of the $SF_6$ gas due to the supercooling of the gas-filled duct transmission line 11, i.e. the deterioration in the dielectric strength of the gas, is prevented. In addition, the evaporation of the liquid coolant 24 due to the heat transfer from the line 11 to the cable 10 is prevented.

On the other hand, in case where current is not drawn or where the cable is initially cooled, the external manipulating rod 35 is shifted to the left by means of the manipulator 16 to disengage the contactor 32 from the connector member 31. Under such a condition, the temperature at the connector member 31 of the connecting conductor 29 is much lower than normal temperature since no current is drawn through the conductor 29, that is, no Joule heat is generated therein, but the space surrounding the connector member 31 is vacuum and therefore thermally insulating so that the $SF_6$ gas filling the space 28 of the gas-filled duct line 11 is never supercolled. Moreover, with this disconnecting switch means, heat transfer from the line 11 to the cable 10 never takes place so that the liquid coolant can be efficiently introduced into the cable conductor 21 at the initial cooling of the cable conductor 21. The contactor 32 is provided on the gas-filled duct transmission line and operated by the external manipulating rod 16, which is formed of a thermal insulating material so that thermal transmission through the external manipulating rod 16 to the extremely low temperature cable 10 is prevented. If the contactor 32 is brought into contact with the connector member 31 in advance of current conduction after the cooling of the cable 10 is completed, then transient heat transfer from the contactor 32 to the connector member 31 takes place and the contactor 32 begins to be cooled. However, if current is drawn in a short moment, the steady-state current conduction is established before the temperature of the conductor 25 of the line 11 is lowered to excess and therefore the insulating property of the $SF_6$ gas is deteriorated.

Figure 3:
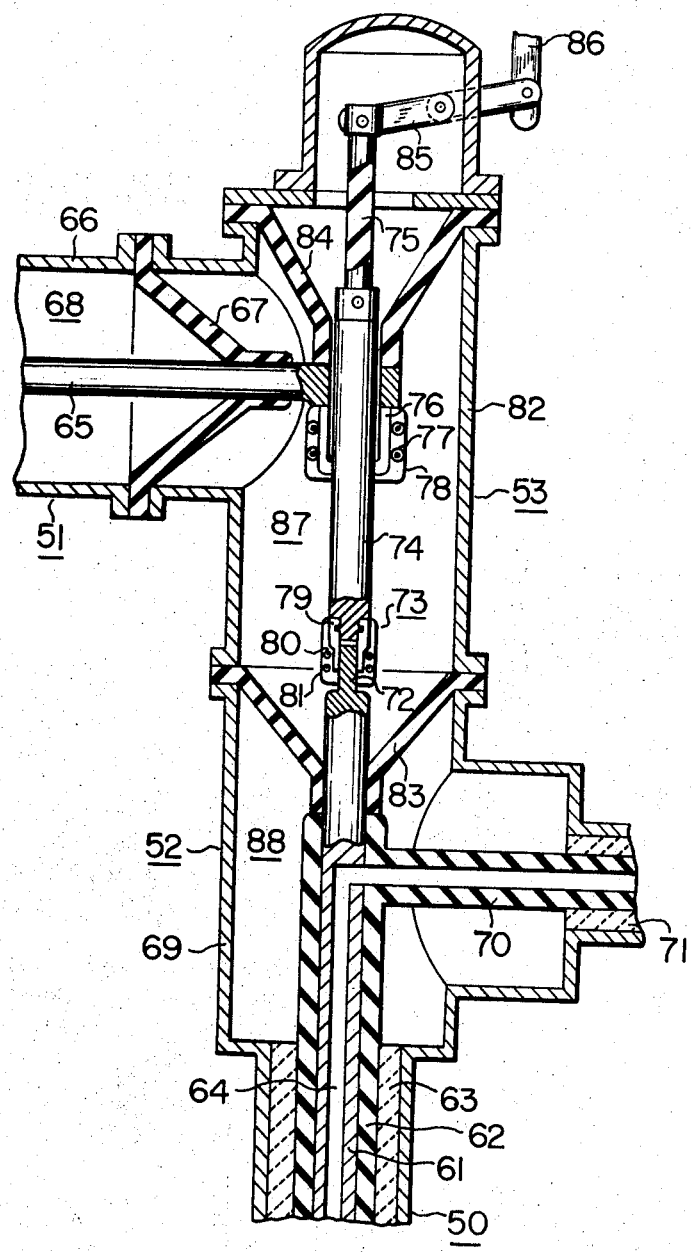
FIG. 3 is a cross sectional view of a device as another embodiment of the present invention, which serves to connect an extreme low temperature cable with a gas-filled duct transmission line.

FIG. 3 shows another embodiment of the present invention. In FIG. 3, there is illustrated an extreme low temperature cable 50 comprising a hollow cable conductor 61, an electrical insulator 62 covering the cable conductor 61 and a thermal insulator 63 coated on the electrical insulator 62, the hollow of the cable conductor 61 being filled with liquid coolant 64 which cools the conductor down to extremely low temperature.

A gas-filled duct transmission line 51, on the other hand, comprises a conductor 65, a casing 66 and a spacer 67, and the internal space 68 is filled with $SF_6$ gas as insulator. The end portion 52 of the cable 50 is housed in a casing 69 which defines a closed space 88 with the cable 50 and provided with a coolant outlet port 70 of the insulating material for letting out the liquid coolant 64, which port 70 is covered outside the casing 69 with a thermal insulator 71.

A disconnecting switch 53 comprises a movable contactor 73 detachably engaged with a fixed contactor 72 formed at the end of the cable conductor 61 and a connecting rod 74 supporting the movable contact 73 at its one end and engaged slidably with the conductor 65 at the other end, the connecting rod 74 being at the other end connected rigidly with the manipulating rod 75 of electrically insulating material. The slidable contact between the conductor 65 of the gas-filled duct line 51 and the connecting rod 74 is maintained by means of a collector 76 fixed to the conductor 65 and kept in slidable contact with the rod 74. A spring 77 urges the collector 76 against the rod so as to establish a stable contact between the collector 76 and the rod 74. A shield member 78 covers the collector 76. The movable contactor 73 comprises a contacting piece 79, a spring 80 for applying urging force to the contacting piece 79 and a shield member 81 covering the spring 80. These components constituting the disconnecting switch 53 is housed in a casing 82. The end of the cable conductor 61 is supported in place by a spacer 83 fixed to the casing 82 and the collector 76 is supported rigidly by a spacer 84 fixed to the casing 82. The manipulating rod 75 is connected via link lever 85 with an external manipulating rod 86. The space 87 within the casing 82 is vacuum. Therefore, a hermetical sealing is provided between the casing 82 and the link lever 85 and the spacer 67 for the duct line 51 also hermetical seals the duct casing 66 and therefore the casing 82. The space within the casing 69 for the end portion 52 of the extreme low temperature cable 50 is also vacuum.

FIG. 3 shows the state of the disconnecting switch in which current is flowing from the cable conductor 61 of the extreme low temperature cable 50, through the fixed contactor 72, the movable contactor 73, the connecting rod 74 and the collector 76, to the conductor 65 of the gas-filled duct transmission line 51. In this state, a temperature gradient from extremely low to normal temperatures is established between the cable 50 and the gas-filled duct line 51 due to Joule heat generated in the conducting part between the conductors 61 and 65. Consequently, it never happens that the $SF_6$ gas as insulator is liquefied or solidified due to the supercooling of the conductor 65 of the gas-filled duct line 51 with the result that the dielectric strength of the $SF_6$ gas is degraded, and that heat is transferred to the conductor 61 of the cable 50 to vaporize the liquid coolant 64 too much.

If, on the other hand, no current is drawn through the connecting part, the external manipulating rod 86 is actuated downward by means of a manipulator (not shown). Accordingly, the connecting rod 74 is shifted upward through the associated movement of the link lever 85 and the insulating manipulating rod 75 so that the movable contactor 73 is disengaged from the fixed contactor 72. Then, thermal insulation is established between the movable and the fixed contactors 73 and 72 since both the contactors are placed in vacuum. Consequently, it never happens that the $SF_6$ gas of the internal space 68 of the gas-filled duct line 51 is supercooled and that heat transfer from the gas-filled duct transmission line 51 to the extreme low temperature cable 50 takes place.

In the embodiment shown in FIG. 3, there is provided no special means for creating a temperature gradient such as the indentations of the connecting conductor 29 in the embodiment shown in FIG. 2, but this simplified device can also establish a suitable temperature gradient between the extreme low temperature cable 50 and the gas-filled duct transmission line 51 if liquid nitrogen, the temperature of which is relatively higher, is used as coolant.

In each of the above described embodiments, the internal space of the connecting part is kept vacuum, but a pressurized gas of helium, hydrogen or neon may be introduced instead into the space. In such a case, however, electrical and thermal insulation property is less improved than in case where the space is vacuum. And, in order to obtain insulation to the same degree as in vacuum, the size of the casing and therefore the volume of the insulating gas must be increased. However, in case where liquid nitrogen is used as coolant for the extreme low temperature cable, the transfer of heat enough to liquefy the insulating medium such as $SF_6$ gas is prevented even if pressurized helium, hydrogen or neon gas, which is not liquefied at the temperature or liquid nitrogen, is introduced in the space of the connecting part.

We claim:

1. A device for connecting an extremely low temperature cable with a noraml temperature electrical apparatus; said extremely low temperature cable consisting of a first conductor, an electrical insulating means provided around said first conductor, a thermal insulating means provided around said electrical insulating means and a liquid coolant kept at extremely low temperature and in contact with said conductor; and said normal temperature electric apparatus consisting of a second conductor, a first casing housing said second conductor therein and spaced from said second conductor and an electrical insulating medium contained in said casing; said device comprising means for forming a temperature gradient from an extremely low temperature to a normal temperature including a connecting conductor for connecting said first conductor with said second conductor;

a second casing provided between said thermal insulating means and said first casing and housing said connecting conductor therein, said second casing being spaced from said connecting conductor and electrically insulated therefrom;

spacer means for hermetically sealing said second casing from said cable and said electric apparatus and a disconnecting switch including at least a pair of contactors provided in said second casing between a part of said connecting conductor and said second conductor, one of said contactors being movable so that said contactors may be separated from each other when current is to be interrupted so as to cut off thermal conduction through said connecting conductor.

2. A device according to claim 1, wherein the space formed within said second casing between said cable and said apparatus is vacuum.

3. A device according to claim 1, wherein the space formed in said second casing between said cable and said apparatus is filled with a pressurized gas having a liquefication temperature lower than that of said coolant.

4. A device according to claim 1, wherein said contactors comprise a fixed contact provided on said cable side and a movable contact provided on said apparatus side and movable to contact with said fixed contact.

5. A device according to claim 1, wherein said contactors are mounted to permit said first conductor to slide in the axial direction thereof and to compensate for the change of the length in the axial direction of said first conductor due to thermal expansion and contraction thereof.

6. A device according to claim 1, wherein said connecting conductor is provided with means for introducing therein vaporized gas derived from said liquid coolant to create in said connecting conductor a temperature gradient from near normal temperature to an extremely low temperature.

7. A device according to claim 1, wherein said normal temperature electrical apparatus is a gas-filled duct transmission line having a spacer fixed to said first casing and supporting said second conductor in the center thereof and $SF_6$ gas contained in said first casing.

8. A device according to claim 1, wherein said connecting conductor is a substantially linear extension of said first conductor, said one of said contactors including an elongated conductor bar disposed transversely to said connecting conductor to which the other contactor is connected, said elongated conductor bar being in sliding contact with said second conductor.

9. A device according to claim 1, wherein said connecting conductor is a substantially linear extension of said first conductor, said one of said contactors including an elongated conductor bar disposed transversely to and insulating contact with said second conductor.

* * * * *